United States Patent
Vauthey et al.

(10) Patent No.: US 6,562,391 B1
(45) Date of Patent: May 13, 2003

(54) AROMA PRODUCT COMPRISING FLAVORING COMPOUNDS

(75) Inventors: Sylvain Vauthey, Boston, MA (US); Martin Leser, Morrens (CH); Christian Milo, Lausanne (CH)

(73) Assignee: Nestec S.A., Vevey (CH)

(*) Notice: Subject to any disclaimer, the term of this patent is extended or adjusted under 35 U.S.C. 154(b) by 0 days.

(21) Appl. No.: 09/635,195

(22) Filed: Aug. 9, 2000

Related U.S. Application Data

(63) Continuation of application No. PCT/EP99/09795, filed on Dec. 9, 1999.

(51) Int. Cl.[7] .................................................. A23L 2/56
(52) U.S. Cl. ........................ 426/533; 426/534; 426/535; 426/650; 426/662
(58) Field of Search ............................ 426/533, 534, 426/535, 536, 537, 538, 650, 651, 662, 520

(56) References Cited

U.S. PATENT DOCUMENTS

| | | | |
|---|---|---|---|
| 4,466,986 A | | 8/1984 | Guggenbuehler et al. ... 426/533 |
| 5,039,543 A | * | 8/1991 | Lee et al. .................. 426/533 |

FOREIGN PATENT DOCUMENTS

| | | |
|---|---|---|
| EP | 0 486 822 A1 | 5/1992 |
| WO | WO 92/09209 | 6/1992 |
| WO | WO 94/07377 | 4/1994 |
| WO | WO 95/35035 | 12/1995 |

OTHER PUBLICATIONS

Boyle, Elizabeth, "Monoglycerides in Food Systems: Current and Future Uses," *Foodtechnology* 51:8, pp. 52–59, Aug. 1997.

* cited by examiner

*Primary Examiner*—Leslie Wong
(74) *Attorney, Agent, or Firm*—Winston & Strawn

(57) ABSTRACT

The invention relates to an aroma product containing flavoring compounds and a process for preparing the aroma product. The aroma product is prepared by dissolving amino acids, peptides or hydrolyzed proteins and reducing sugars in water or by dissolving aroma precursors in water to form a solution; introducing an edible surfactant into the solution to provide a surfactant containing solution; heating the surfactant containing solution to a temperature sufficient to form a mesomorphic phase structure or a microemulsion, heating the surfactant containing solution for a sufficient time to develop flavoring compounds; and cooling the surfactant containing solution. The resulting aroma product can be used in a variety of food products to enhance the flavor and/or aroma of the food product.

17 Claims, No Drawings

AROMA PRODUCT COMPRISING FLAVORING COMPOUNDS

CROSS REFERENCES TO RELATED APPLICATIONS

This application is a continuation of the US designated national phase of PCT application PCT/EP 99/09795 filed Dec. 9, 1999, the content of which is expressly incorporated herein by reference thereto.

FIELD OF THE INVENTION

The present invention relates to an aroma product containing flavoring compounds and a process for preparing the aroma product.

BACKGROUND

The Maillard reaction is well known as a means for non-enzymatically browning food products. The Maillard reaction is an important method in the food industry to produce flavor, taste, and color in cooked food products. The reaction occurs when a mixture of amino acids and reducing sugars are heated and allowed to react. The reaction provides a broad range of compounds, the reaction can provide more than 200 different compounds. It is well known in food technology that the Maillard reaction can be used to produce a wide range of aroma compounds.

U.S. Pat. No. 4,466,986, for example, is directed to a process for the production of a flavoring agent that resembles the taste of meat, fish, or mushrooms. According to this process a liquid protein hydrolysate is reacted with at least one monosaccharide by heating. The reaction is carried out in water. Carrying out the reaction in a purely aqueous medium, however, results in a reaction that is low in yield. Furthermore, it is not possible to obtain a broad range of aroma compounds.

It is also possible to obtain flavor compounds by the thermal degradation of aroma precursors. This type of reaction also does not provide high yields of flavor compounds and does not provide a very broad range of aroma compounds.

Surfactants self-associate when dissolved into aqueous solutions and form a variety of structures ranging from micelles to mesomorphic structures (also called mesophases) such as lamellar, hexagonal, cubic or β-crystalline phases. These phases are mainly used in foodstuffs as structuring or fat replacing agents (See, e.g., WO 92/09209, WO 94/07377, WO 95/35035). The molecular arrangement of the surfactant molecules with the aqueous phase gives the product its viscosity and consistency. The surfactants, however, have an off-taste, which especially is apparent if the edible surfactant is a monoglyceride and present in a mesomorphic phase. WO 94/07377 discloses that the off-taste can be avoided if low levels of sweetening agents are added.

Other applications of monoglycerides in food systems are summarized in E. Boyle, "Monoglycerides in Food Systems: Current and Future Uses" FOOD TECHNOLOGY, vol. 51, No. 8, 1997, pages 52–59. The use of a mesomorphic structure to generate food flavors, however, has not been mentioned.

EP Patent No. 486,822 concerns the generation of food flavors. The patent describes a process for preparing a flavorant by heating an aqueous mixture of a phospholipid, amino acid source, and a reducing sugar at an elevated temperature. The flavor generation, however, is not related to the presence of a mesomorphic structure formed by the presence of the edible surfactant. The process involves the use of self-aggregated microstructures, made of edible surfactants, to increase flavor generation in Maillard reactions or thermal degradation reactions. Incorporating the flavor precursor molecules into the microstructures increases the reaction yield, extends the number of reaction compounds that are obtained, and stabilizes relatively unstable reaction compounds after they are formed.

There remains a need, however, for improved processes to obtain flavor compounds in high yield and to obtain a broad range of flavor compounds.

SUMMARY OF THE INVENTION

The invention relates to a process for preparing an aroma product containing flavoring compounds. The process involves dissolving amino acids, peptides or hydrolyzed proteins and reducing sugars in water or dissolving aroma precursors in water to form a solution; introducing an edible surfactant into the solution to provide a surfactant containing solution; heating the surfactant containing solution to a temperature sufficient to form a mesomorphic phase structure or a microemulsion, heating the surfactant containing solution for a sufficient time to develop flavoring compounds; and cooling the surfactant containing solution to obtain the flavoring compounds.

The surfactant may be a monoglyceride, a phospholipid, or a mixture thereof. In one embodiment the surfactant is a substantially saturated monoglyceride with a carbon chain that is substantially between 16 and 18 carbons. The monoglyceride may be a 100% saturated C16 compound, a 100% saturated C18 compound, or a mixture thereof. The mesomorphic phase may be a cubic phase.

The amino acids may be cysteine, methionine, glycine, glutathione, monosodium glutamate, or mixtures thereof. The proteins may be milk proteins, soy proteins, cereal proteins, vegetable proteins, meat proteins, or mixtures thereof. The aroma precursor may be thiamine. The sugars may be monosaccharides, disaccharides, and oligosaccharides. The sugar may be ribose, xylose, glucose, fructose, rhamnose, galacturonic acid, and mixtures thereof.

The monoglyceride may be about 40 to 95 percent by weight of the solution; the amino acids, proteins, or peptides may be about 0.5 to 20 percent by weight of the solution; the sugars may be about 0.5 to 20 percent by weight of the solution; and the aroma precursors may be between about 0.5 to 20 percent by weight of the solution. In another embodiment of the method the monoglyceride may be about 60 to 80 percent by weight of the solution; the amino acids, proteins, or peptides may be about 0.1 to 10 percent by weight of the solution; the sugars may be about 0.1 to 10 percent by weight of the solution; and the aroma precursors may be between about 0.1 to 10 percent by weight of the solution. The amount of water may be about 30 percent by weight of the solution. The amount of water may also be about 20 percent by weight of the solution.

The mixture may be heated between about 60 and 180° C. for about 1 hour to 8 hour or the mixture may be heated at a temperature of about 100° C. for about 4 hours.

The process may also include the step of drying the surfactant containing solution. The drying may be spray-drying or freeze drying.

The invention also relates to an aroma product prepared according to the method of the invention and to a food product containing the aroma product of the invention. The food product may be bouillons; soups; sauces; gravies;

petfoods; snacks; canned foods; casserole dishes; frozen human foods; meat spreads; dips; bakery products; and replacements for beef, chicken, pork, fish, or seafood. The aroma product is present in the food product in an amount from about 0.05 to 10 percent by weight of the food product.

DETAILED DESCRIPTION OF THE PREFERRED EMBODIMENTS

The invention concerns an aroma product comprising flavoring compounds and a process for manufacturing the aroma product. The process produces a wide range of flavor compounds and produces the flavor compounds in high yields. The aroma product is obtained by a process that involves dissolving amino acids, peptides or hydrolyzed proteins, and reducing sugars in water or dissolving aroma precursors in water; introducing into the aqueous solution an edible surfactant; heating the resulting mixture to produce a mesomorphic phase structure or a microemulsion; maintaining the heating at a sufficient temperature and for a sufficient time to develop flavoring compounds; and cooling the mixture.

By aroma product is meant a product that can be added to a food product to impart, improve or enhance the aroma and/or flavor of the food product.

When a mixture of amino acids, peptides or hydrolyzed proteins, and reducing sugars are used, it is the Maillard reaction which takes place to provide the flavoring compounds. When aroma precursors are used, it is a thermal degradation of the aroma precursors which takes place to provide the flavoring compounds.

The term aroma precursor, as used herein, means any compound that can be converted to an aroma product by heating or by other conversion media.

The term microemulsion, as used herein, means a stable emulsion that has a particle size less than about 100 nanometers, preferably between about 1 and 100 nanometers.

The term mesomorphic phase as used herein, means a state of matter intermediate between a crystalline solid and a normal isotropic liquid, in which long rod shaped organic molecules contain dipolar and polarizable groups. The mesomorphic phase can be a lamellar liquid, or a hexagonal or a cubic phase. Preferably the mesomorphic phase a cubic phase.

The term hexagonal phase, as used herein, means a structure characterized by the regular alteration of two layers, the atoms in each layer lie at the vertices of an equilateral triangle and the atoms in one layer lie directly above the centers of the triangles in neighboring layers.

The term cubic phase, as used herein, means a structure in which the forms are referred to three equal mutually perpendicular axes.

The term lamellar liquid, as used herein, means a system whose grains are in the form of thin sheets.

Cubic phases can be used to solubilize large amount of hydrophilic, hydrophobic, and amphiphilic molecules without significantly changing the main rheological properties of the mixture. Moreover, the inherent high viscosity of the cubic phase, as well as a three-dimensional structure with well-defined water channels, makes cubic phase attractive as a potential delivery system to provide sustained release of volatile compounds into the air.

Rather than using the mesomorphic phase to solubilize guest molecules, it has been found, according to the invention, that flavoring compounds can be generated directly in the mesomorphic phase. Thus, the cubic phases play the role of an active matrix where the aroma is created at a defined time, in the final product, by heating, and then released in a controlled way. Mesomorphic phases, in particular cubic phases, are an innovative tool to manage flavor generation pathways since the structure is able to compartmentalize and concentrate the potential precursors to flavoring compounds and final flavoring compounds.

It is important to use an edible surfactant. Preferably, the surfactant is a monoglyceride, which is substantially saturated and with a carbon chain that is substantially between 16 and 18 carbons. By substantially saturated is meant that the amount of unsaturated monoglycerides is not more than about 20% weight of the total monoglycerides, preferably not more than 10% by weight of the total monoglycerides, and more preferably not more than 5% by weight of the total monoglycerides. Having a carbon chain that is substantially between 16 and 18 carbons means the amount of monoglycerides with a carbon chain that is not between 16 and 18 carbons in length is not more than about 20% by weight of the total monoglycerides, preferably not more than 10% by weight of the total monoglycerides, and more preferably not more than 5% by weight of the total monoglycerides. Most preferably, the monoglyceride is a 100% saturated C16 compound, a 100% saturated C18 compound, or a mixture of both.

In another embodiment, the surfactant can be a phospholipid. Lecithin is a suitable phospholipid that may be used in the method of the invention. It is also possible to use as the surfactant a mixture of a monoglyceride and another edible surfactant, such as, for example, a phospholipid.

It is known that a Maillard reaction takes place at a temperature between about 60 and 180° C. Examining the phase diagrams for different monoglycerides, it becomes apparent that the use of unsaturated monoglycerides decreases the cubic to hexagonal phase transition temperature to a temperature below 100° C. At these temperature, however, it is not possible to induce an efficient Maillard reaction. By using a substantially saturated monoglyceride having a chain length between 16 and 18 carbons, however, the cubic to hexagonal phase transition temperature increases to a range where an efficient Maillard reaction can occur. The cubic phase region occurs at a temperature of between about 80 and 120° C., which is sufficient for the Maillard reaction to efficiently take place.

The monoglycerides used in the process of the invention are typically solid at room temperature. Thus, it is necessary to add the monoglycerides to the aqueous solution at a temperature sufficient for the monoglyceride to melt. Typically the aqueous solution containing the amino acids, peptides or hydrolyzed proteins, and reducing sugars, or aroma precursors is heated to about 60° C. before the monoglyceride is added. The monoglyceride can also be heated to a temperature sufficient to melt it before it is added to the aqueous solution.

Without wishing to be bound by theory, it is believed that a possible mechanism to account for the remarkable rate enhancement in the Maillard reaction and the thermal degradation reaction is a compartmentalization of the reactants (amino acids, peptides or hydrolyzed proteins, and reducing sugars, or aroma precursors) at the monoglyceride-water interface or close to it. The a locally high concentration of reactants provides the rate enhancement. Under these conditions, where the reactants are highly concentrated, there are higher yields of key odorant molecules and the formation of new volatile compounds which are normally not detected when the reaction occurs in bulk water.

Amino acids useful in the process of the invention include, but are not limited to, cysteine, methionine, glycine, gluthathione, monosodium glutamate, and mixtures thereof. Proteins and peptides useful in the process of the invention include, but are not limited to milk proteins, soy proteins, cereal proteins, vegetable proteins, and meat proteins. Representative proteins include, but are not limited to, wheat gluten, wheat germ, corn gluten, and linseed protein. The peptides may be natural or synthetic.

Any aroma precursor may be used in the process of the invention. Preferably, the aroma precursor is thiamine.

Reducing sugars useful in the process of the invention include, but are not limited to mono-, di- and oligosaccharides. Representative sugars useful in the method of the invention include, but are not limited to, ribose, xylose, glucose, fructose, rhamnose, and galacturonic acid.

The amount of monoglyceride in the reaction solution is from about 40 to 95% by weight of the solution, preferably from about 50 to 90% by weight of the solution, and most preferably from about 60 to 80% by weight of the solution. The amount of amino acids, proteins, peptides and reducing sugars is from about 0.5 to 20% by weight of the solution, preferably from about 0.7 to 15% by weight of the solution, and most preferably from about 0.1 to 10% by weight of the solution. The amount of aroma precursors is from about 0.5 to 20% by weight of the solution, preferably from about 0.7 to 15% by weight of the solution, and most preferably from about 0.1 to 10% by weight of the solution. The remaining percentage comprises water. The amount of water is about 30% by weight of the solution, preferably about 25% by weight of the solution, and most preferably about 20% by weight of the solution.

According to the invention, the mixture is heated at a temperature of between about 60 and 180° C., preferably the temperature is not more than about 160° C., and more preferably not more than about 150° C. The mixture is heated for about 30 minutes to 10 hours, preferably about 45 minutes to 9 hours, and most preferably for about 1 hour to 8 hours. In a most preferred embodiment the mixture is heating at a temperature of about 100° C. for about 4 hours, because of the necessity to stay in the cubic phase region and to avoid the use of a pressurized reaction vessel. Generally the Maillard reaction occurs at higher temperature (about 140–180° C.) and shorter time (about 10–20 minutes). The method of the invention generally allows the Maillard reaction to take place at lower temperatures and over a longer period of time.

For the thermal reaction of the aroma precursors, the solution is heated at the same temperature range as for the Maillard reaction.

The presence of the monoglyceride in the cubic phase allows the compounds that are formed by the Maillard reaction or the thermal reaction to be encapsulated. The compounds are encapsulated in a manner such that the compounds are released in a controlled manner.

It has been found that the process of the invention, can increase the amount of certain compounds that are formed by the Maillard reaction by up to a factor of ten.

Cooling the solution can be accomplished by allowing the solution to cool at room temperature. Cooling, however, may be accelerated by using a refrigeration device. Although the cooling step introduces a phase change from, for instance, the cubic phase to a liquid lamellar and then to a lamellar crystalline phase (β-crystals and aqueous phase), the reaction products are believed to remain complexed inside of the mesomorphic structure.

The aroma product of the invention can be used in a variety of food products. Generally the aroma product is added in an amount of about 0.05 to 10 percent by weight of the food product, preferably 0.075 to 7 percent by weight of the food product, and more preferably 0.1 to 5 percent by weight of the food product. Food products that the aroma product may be added to include, but are not limited to bouillons, soup sauces, gravies, pet foods, snacks, canned foods, casserole dishes, frozen human foods, meat spreads, dips, bakery products, replacements for beef, chicken, pork, fish and seafood, and the like.

The aroma product may be combined with the food product in any manner. It is possible to add the aroma product directly to the food product or it is possible to prepare a dispersion of the aroma product in an aqueous medium and then mix the aqueous mixture with the food product. It is also possible to first dry the aroma product to form a powder and then add the powder to the food product. Drying may be accomplished by spray drying or freeze-drying, for example.

The invention is further defined by reference to the following example describing in detail the preparation of the aroma product of the invention. The example is representative, and should not be construed to limit the scope of the invention.

EXAMPLES

An aroma product of the invention was prepared by first dissolving 2 mmol of cysteine and 2 mmol of ribose in 10 ml of a phosphate buffer (0.5 mol/l) at pH 5.0 to provide a solution. The cubic phase was then prepared by introducing into a pyrex tube 1 g of the solution and 4 g of the monoglyceride Dimodan PV (commercially available from the Danisco Cultor of New Century, Kans.) that was melted at 60° C. After vigorous stirring, the tube was placed in an oil bath at 104° C. for 1 minute and stirred again to form a homogeneous cubic phase. Finally, the cubic phase was thermally treated for 4 hours at 100° C. A reference sample, without the monoglyceride, was prepared in the same manner.

The sensory properties of the aroma product of the invention and the reference were compared by an untrained technical sensory panel. The aroma product of the invention was found to have an overall more intense flavor with a strong rubber, egg-like, roast chicken-like aroma.

The reference was also evaluated after transforming the reference solution into a cubic phase system to provide similar volatile-matrix interactions as are present in the aroma product of the invention. The mixture that resulted after the reference solution was transformed into a cubic phase system was described as weak in aroma and having an aroma reminiscent of meat and lard with some burnt character.

The volatile components formed in the cubic phase were also compared to those in the reference by gas chromatography. Table I provides a comparison of some flavor compounds in the aroma product of the invention and the reference sample.

TABLE I

Comparison of Flavor Components in the Aroma Product of the Invention and a Reference Sample.

| Component | Cubic phase (µg) | Reference (µg) |
|---|---|---|
| 2-Methyl-3-furanthiol (MFT) | 18.4 | n.d.* |
| 2-Methyl-3 (2H)-furanone | 36.7 | 13.1 |
| Furfural | 874.3 | 351.0 |
| Furfurylthiol | 12.0 | trace |
| 3-Mercapto-2-pentanone | trace | n.d.* |
| Norfuraneol | 698.1 | 291.1 |

*n.d. = not detected.

The data provided in the table shows drastic differences between the aroma product of the invention and the reference sample. The data show that there is a much higher concentration of sulfur compounds in the aroma product prepared by the process of the invention. In particular the results show a significant increase in the concentration of furfurylthiol in the in the aroma product prepared by the process of the invention compared to the reference sample in which only trace amounts were detected. Furthermore, the potent odorant 2-methyl-3-furanthiol (MFT) was only detected in the in the aroma product prepared by the process of the invention and not in the reference sample. Similarly the potential precursors to MFT, furfural and norfuraneol, are formed in much higher amounts in the aroma product prepared by the process of the invention. Furfural and norfuraneol, are formed in the in the aroma product prepared by the process of the invention in an amount that is 2.5 fold higher than in the reference sample.

What is claimed is:

1. A process for preparing an aroma product comprising flavoring compounds comprising:

dissolving amino acids, peptides or hydrolyzed proteins and reducing sugars in water or dissolving aroma precursors in water to form a solution;

introducing an edible monoglyceride composition into the solution to provide a monoglyceride containing solution;

heating the monoglyceride containing solution to a temperature sufficient to form a mesomorphic phase structure or a microemulsion, heating the monoglyceride containing solution for a sufficient time to develop flavoring compounds; and cooling the monoglyceride containing solution to obtain the flavoring compounds.

2. The process of claim 1, wherein the monoglyceride composition comprises a monoglyceride, or a mixture of a monoglyceride and a phospholipid.

3. The process of claim 2, wherein the monoglyceride is substantially saturated and has a carbon chain comprising substantially between 16 and 18 carbons.

4. The process of claim 3, wherein the monoglyceride is a 100% saturated C16 compound, a 100% saturated C18 compound, or a mixture thereof.

5. The process of claim 1, wherein the mesomorphic phase is a cubic phase.

6. The process of claim 1, wherein the amino acids comprise cysteine, methionine, glycine, glutathione, monosodium glutamate, or mixtures thereof; the proteins comprise milk proteins, soy proteins, cereal proteins, vegetable proteins, meat-proteins, or mixtures thereof.

7. The process of claim 1, wherein the aroma precursor is thiamine.

8. The process of claim 1, wherein the sugars comprise monosaccharides, disaccharides, and oligosaccharides.

9. The process of claim 8, wherein the sugars comprise ribose, xylose, glucose, fructose, rhamnose, galacturonic acid, or mixtures thereof.

10. The process of claim 1, wherein the monoglyceride comprises about 40 to 95 percent by weight of the solution; the amino acids, proteins, or peptides comprise about 0.5 to 20 percent by weight of the solution; the sugars comprise about 0.5 to 20 percent by weight of the solution; and the aroma precursors comprise between about 0.5 to 20 percent by weight of the solution.

11. The process of claim 10, wherein the monoglyceride comprises about 60 to 80 percent by weight of the solution; the amino acids, proteins, or peptides comprise about 0.1 to 10 percent by weight of the solution; the sugars comprise about 0.1 to 10 percent by weight of the solution; and the aroma precursors comprise between about 0.1 to 10 percent by weight of the solution.

12. The process of claim 1, wherein the amount of water is about 30 percent by weight of the solution.

13. The process of claim 12, wherein the amount of water is about 20 percent by weight of the solution.

14. The process of claim 1, wherein, the mixture is heated between about 60 and 180° C. for about 1 hour to 8 hours.

15. The process of claim 1, wherein, the mixture is heated at a temperature of about 100° C. for about 4 hours.

16. The process of claim 1, further comprising drying the surfactant containing solution.

17. The process of claim 16, wherein the drying is spray-drying or freeze drying.

* * * * *

UNITED STATES PATENT AND TRADEMARK OFFICE
CERTIFICATE OF CORRECTION

PATENT NO. : 6,562,391 B1
DATED : May 13, 2003
INVENTOR(S) : Vauthey et al.

It is certified that error appears in the above-identified patent and that said Letters Patent is hereby corrected as shown below:

<u>Title page,</u>
Insert the following section just before Item [56], References Cited:
-- [30]  Foreign Application Priority Data
Dec. 10, 1998   (EP) ...................... 98123554 --.

Signed and Sealed this

Twenty-sixth Day of August, 2003

JAMES E. ROGAN
*Director of the United States Patent and Trademark Office*